United States Patent [19]

Iggulden

[11] Patent Number: 4,685,133

[45] Date of Patent: Aug. 4, 1987

[54] WIRELESS AUDIO TRANSMISSION SYSTEM

[75] Inventor: Jerry R. Iggulden, Valancia, Calif.

[73] Assignee: INR Technologies, Inc., Northridge, Calif.

[21] Appl. No.: 776,611

[22] Filed: Sep. 16, 1985

[51] Int. Cl.[4] .......................... H04H 5/00; H04B 3/00
[52] U.S. Cl. ............................. 381/3; 455/20; 381/77; 381/80
[58] Field of Search ................ 179/107 R, 107 S, 82, 179/2 C; 455/20, 23, 21; 379/61, 62, 55; 381/2, 3, 4, 14, 26, 77, 80, 81

[56] References Cited

U.S. PATENT DOCUMENTS

| | | | |
|---|---|---|---|
| 3,299,207 | 1/1967 | Cooke | 179/2 C |
| 3,360,071 | 12/1967 | Vogelman | 179/2 C |
| 3,388,375 | 6/1968 | Sloughter | 179/2 C |
| 3,748,397 | 7/1973 | Jones | 179/2 C |
| 4,021,737 | 5/1977 | Trask | 455/21 |
| 4,326,102 | 4/1982 | Culp et al. | 179/2 C |
| 4,415,769 | 11/1983 | Gray | 179/2 C |
| 4,481,382 | 11/1984 | Villa-Real | 379/101 X |
| 4,633,495 | 12/1986 | Schotz | 381/3 |

FOREIGN PATENT DOCUMENTS

| | | | |
|---|---|---|---|
| 2536076 | 3/1977 | Fed. Rep. of Germany | 358/189 |
| 1297208 | 5/1962 | France | 381/79 |

*Primary Examiner*—Forester W. Isen
*Attorney, Agent, or Firm*—Marvin E. Jacobs

[57] ABSTRACT

A system for wirelessly transmitting stereo audio from a source such as a tape player to a removed location. The output signal-carrying wires from the source are connected to a coupler unit adapted to removably hold an FM band stereo broadcast microphone/transmitter. The audio output signal is coupled to the microphone/transmitter which, in turn, transmits the audio signal to an FM stereo receiver at the remote location where it is then rebroadcast for listening. In one embodiment, the coupler unit acoustically couples the signal to the microphone. In a second embodiment, the coupler unit inductively couples the signal to the microphone.

17 Claims, 8 Drawing Figures

WIRELESS AUDIO TRANSMISSION SYSTEM

BACKGROUND OF THE INVENTION

The present invention relates to audio transmission systems and, more particularly, to apparatus for transmitting an audio signal wirelessly between a source and broadcast speakers at a first electrical signal carrying the audio information; using the first electrical signal to create a coupling signal carrying the audio information; using the coupling signal to drive a microphone/transmitter whereby the microphone/transmitter broadcasts an FM band signal carrying the audio information; receiving the FM band signal; converting the FM band signal to a second electrical signal carrying the audio information; and, using the second electrical signal to drive the broadcast speakers.

There are various needs for having a source of audio at one location and a means for broadcasting the audio at a removed location. For example, many homeowners have a stereo player (record, CD, Tape, radio, etc.) at one location within the house itself but desire to have additional speakers at some removed location within the general area, such as in an adjoining room or on the patio. While it is possible, in some cases, to run wire pairs between the player and the speaker for each channel, the use of wires is not always possible. Where wires must pass through walls, holes must be drilled. Once the wires are run, the location of the remote speakers is relatively fixed.

Recently, the use of wireless transmission has become popular for electronic instruments such as telephones. Such devices, since they are actually broadcasting at radio frequencies, are closely controlled by the Federal Communications Commission. Thus, even though it would be desirable to broadcast the audio signal from the house to the patio, for example, until now there has been no way of conveniently doing so because of the FCC regulations involved.

Wherefore, it is the object of the present invention to provide a simple method and apparatus whereby audio signals from a stereo source at one location can be wirelessly transmitted for listening over speakers located at a removed location within the general area.

SUMMARY

The foregoing object has been achieved by the present invention which comprises apparatus for transmitting an audio signal wirelessly between a source and broadcast speakers at a removed location according to a method comprising the steps of converting the audio signal to a first electrical signal carrying the audio information; using the first electrical signal to create a coupling signal carrying the audio information; using the coupling signal to drive a microphone/transmitter whereby the microphone/transmitted broadcasts a signal, preferably an FM band signal carrying the audio information; receiving the broadcast signal; converting the broadcast signal to a second electrical signal carrying the audio information; and, using the second electrical signal to drive the broadcast speakers.

In the preferred embodiment, the apparatus for performing the above-described method comprises input means for receiving an electrical signal containing stereo audio information at an input thereof; a stereo microphone/transmitter for transmitting audio received by a microphone portion as FM band electrical signals; and, coupler means connected to the input means for removably holding the microphone/transmitter and for coupling the audio information from the electrical signal to the microphone portion of the microphone/transmitter whereby the audio can be transmitted wirelessly to an FM band stereo receiver and be played for listening by the receiver.

DESCRIPTION OF THE DRAWINGS

FIG. 3 is a simplified cutaway drawing of a prior art stereo FM band wireless microphone/transmitter as incorporated into the system of the present invention;

FIG. 7 is an enlarged cutaway view showing the acoustically coupling approach employed in one embodiment of the present invention; and, FIG. 8 is an enlarged cutaway view showing the inductive coupling approach employed in a second embodiment of the present invention.

DESCRIPTION OF THE PREFFERRED EMBODIMENT

Figure 1:
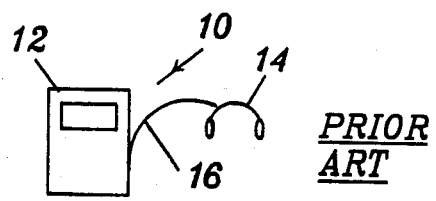
FIG. 1 is a simplified drawing of a typical self-contained stereo source/speaker system according to the prior art.

Turning first to FIG. 1, a basic prior art stereo system of one popular type is shown generally indicated as 10. The system 10 is lightweight and meant to be worn by an individual and, in that regard, is a "personal" stereo. The system 10 comprises a stereo source 12 for playing tapes and/or receiving radio broadcasts. Lightweight headphones 14 are worn on the head and are operably connected to the source 12 by wires 16. The headphones 14, of course, contain miniature speakers that are placed adjacent the ears of the wearer to provide the two channels of the stereo system.

Figure 2:
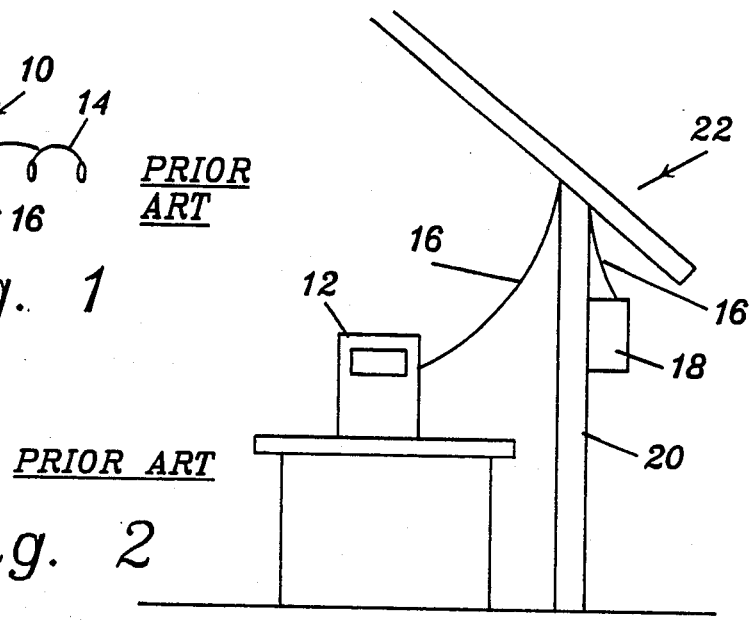
FIG. 2 is a simplified drawing showing the prior art method of connecting the stereo source of FIG. 1 to a speaker system at a removed location.

As shown in FIG. 2 and described under Background of the Invention, the prior art approach to putting speakers 18 at a location remote from the source 12 is to use an elongated set of interconnecting wires 16 passing, for example, through the wall 20 of the house 22.

FCC accepted FM band stereo microphone/transmitters, such as that generally indicated as 24 in FIG. 3, are known in the art. In such devices, a pair of microphones 26 receive stereo audio inputs, as indicated by the arrows 28. The microphones 26 are connected by wires 27 to an FM band transmitter 30 which is powered by self-contained rechargable battery 32 and connected to antenna 34. Recharging electrical connections 36 are provided in the body 38 and connected to the battery 32. When the device is operating, as in FIG. 4, audio inputs 28 are transmitted as audio information on an FM band radio signal 40 which is received by FM receiver 42 which, in turn, drives its speakers 18 with an electrical signal derived from the audio information carried by the received signal 40.

Figure 4:
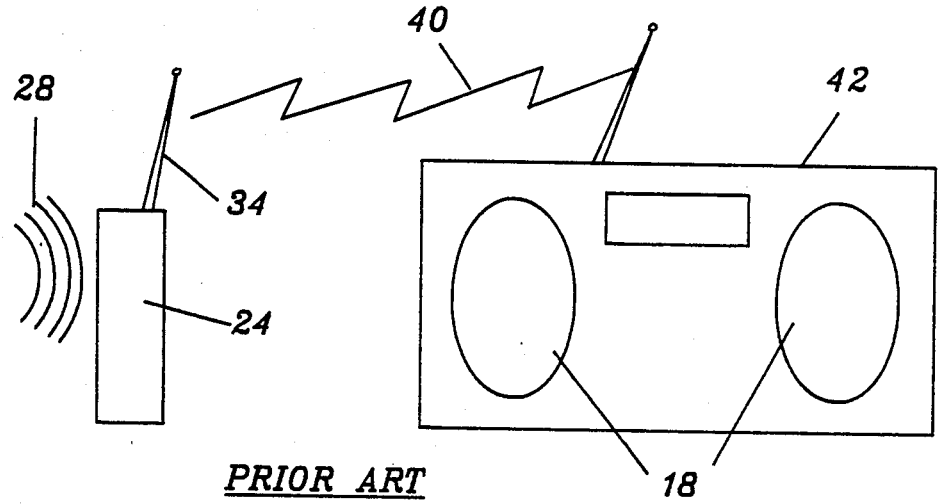
FIG. 4 is a simplified drawing showing the manner of operation of the microphone/transmitter of FIG. 3.
Figure 5:
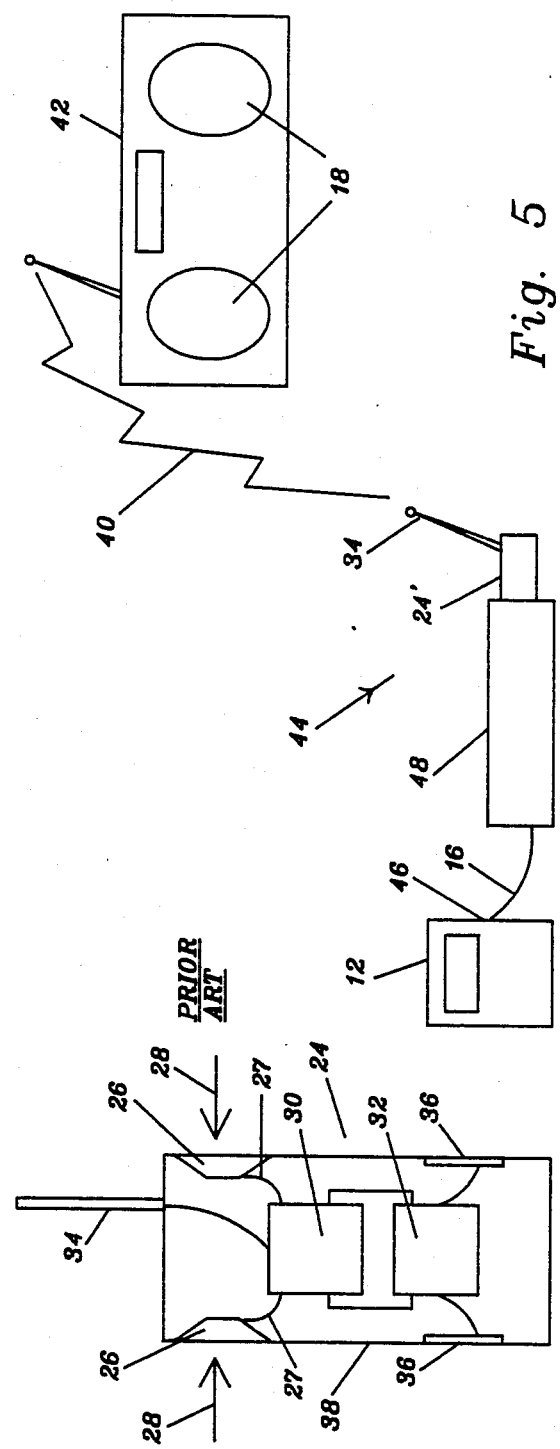
FIG. 5 is a simplified drawing showing the system of the present invention and its manner of operation.

The present invention employs an adaptation of the FCC accepted microphone/transmitter 24 of FIG. 4 in a system as shown in FIG. 5. As shown therein, the system of the present invention, generally indicated as 44, comprises a stereo source 12 producing an electrical output at 46 which is connected by wires 16 to a unique coupling device 48, which will be described in greater detail hereinafter. In the coupling device 48, the electrical signal on wires 16 carrying the audio information is converted to a coupling signal. The coupling device 48 is adapted to receive and hold the FM microphone/transmitter 24 and to couple the coupling signal to the microphones 26. The transmitter 30 transmits signal 40, as described above with respect to FIG. 4, which is then received in like manner by FM receiver 42 and broadcast over speakers 18.

Figure 6:
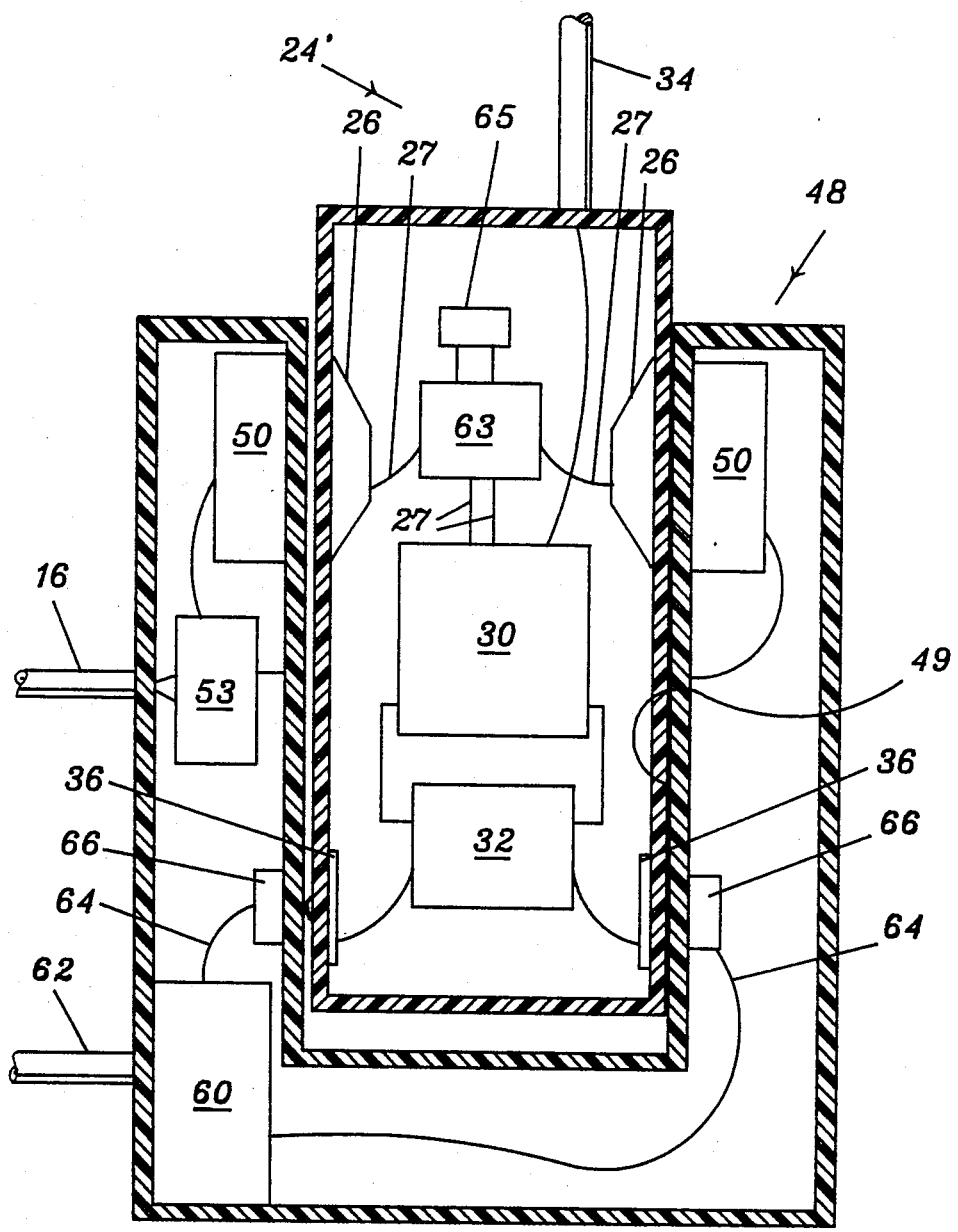
FIG. 6 is a simplified cutaway drawing showing the microphone/transmitter of FIG. 3 operably mounted in the coupling unit of the present invention.

Turning now to FIGS. 6-8, the construction and operation of the coupling device 48 will now be described in greater detail. The coupling device 48 contains a slot or "nest" 49 adapted to receive and hold the microphone/transmitter 24 in an operating position. A pair of couplers 50 are positioned so as to be close adjacent respective ones of the microphones 26. Internally, the couplers 50 are connected by wires 52 through a power amplifier 53 to the two stereo channels of electrical signals on wires 16. According to one embodiment as shown in FIG. 7, each coupler 50 contains a miniature speaker 54 closely spaced from the microphone 26 to provide acoustical coupling thereto. When closely spaced at about two millimeters, it was found that acoustical coupling could be obtained between the speaker 54 and the microphone 26 with a signal-to-noise ratio acceptable for low fidelity uses.

It is anticipated that the major use for the present invention will be in conjunction with high fidelity audio. As a consequence, the second embodiment for the coupler 50 as shown in simplified form in FIG. 8 in conjunction with certain modifications to the microphone/transmitter 24, to be described hereinafter, is preferred. For implementation of the embodiment of FIG. 8, the microphone/transmitter 24 must be of a high quality type employing a dynamic microphone at 26 which has a coil 58 which moves in combination with a diaphragm 59. In normal, hand-held use, the coil 58 moves in the magnetic field of a magnet 61 which induces an electrical signal carrying the audio information into the wires 27. In the preferred embodiment of FIG. 8, the coupler 50 contains a coil 56 positioned relative to the coil 58 such that an electrical signal on wires 52 causes a magnetic field of coil 56 to pass through coil 58 and induce a similar electrical signal therein and, simultaneously, into wire 27. To provide a high fidelity signal-to-noise ratio, lines 27 between the microphones 26 and the transmitter 30 of the modified microphone/transmitter 24' are cut and an attenuation pad 63, of a type well known to those skilled in the art, inserted in series therewith. The attenuation pad 63 is bypassable by a microswitch 65 which can be operated manually or, preferably, contact the walls of the nest 49 so that the attenuation pad 63 is active when the microphone/transmitter 24' is in the nest 49 and inactive when it is not. As previously mentioned, the stereo signal on wires 16 passes through a power amplifier 53 where it is increased from, typically, a low level to something in the 4-10 watt range. Thus, the signal induced into coil 58 from coil 56 is very large as compared to that induced by the magnet 61. Consequently, attenuation pad 63 attenuates to signal on lines 27 several db before they reach the transmitter 30 for two purposes. First, the "noise" portion of the signal from the movement of the diaphragm is dropped below an audible level. Second, saturation of the transmitter is prevented to maintain a clear high fidelity transmitted signal.

In the preferred embodiment, a recharging source 60 is also provided within the coupling device 48. Source 60 is connectable through power cord 62 to an AC outlet and provides a recharging current through wires 64 and contacts 66 to recharging connections 36 on the microphone/transmitter 24.

As will be appreciated with the present invention, the microphone/transmitter 24 can also be removed from the coupling device 48 and used in its usual manner as, for example, an intercom to the remote location.

Thus, it can be seen that the coupling device 48 of the present invention permits wireless transmission of stereo audio between a source and speakers at a removed location.

As should further be understood and appreciated by those skilled in the art, while the present invention has its principle use in the local wireless transmission of stereo audio information between a source and speakers; and, the description hereinbefore is directed to the description of such a system, the novel aspects of the apparatus and method of operation are equally adaptable to the wireless transmission of other information between a source thereof and a user. For example, alpha-numeric information could be sent by means of the present invention between a computer and a printer in another room. Thus, it is intended that such alternate users be considered within the scope and spirit of the present invention and within the scope of the claim language.

Wherefore, having thus described my invention, I claim:

1. A wireless audio transmission system comprising:
    (a) a portable, hand-held microphone/transmitter for transmitting audio received by a microphone portion thereof as broadcast electrical signals, said microphone/transmitter having a case with at least one microphone inside connected to said microphone portion and disposed adjacent a sidewall thereof; and,
    (b) nesting means having a nest area therein for receiving and substantially surrounding a majority of the surface area of said microphone/transmitter in its said case; said nesting means including input means for receiving an electrical signal containing audio information at an input thereof and coupler means disposed adjacent said nest and connected to said input means for receiving and coupling said audio information from said electrical signal to said microphone of said microphone/transmitter at said sidewall whereby said audio can be transmitted wirelessly to a receiver tuned to receive said broadcast electrical signals.

2. The transmission system of claim 1 wherein: said coupler means includes speaker means for creating an audio signal which is acoustically coupled to said microphone portion.

3. The transmission system of claim 1 wherein: said coupler means includes coil means for creating a magnetic field signal which is inductively coupled into a coil in said microphone portion.

4. The transmission system of claim 1 wherein:
    (a) said microphone/transmitter contains a rechargable battery; and, (b) said nesting means includes charging means for charging said battery when said microphone/transmitter is being held in said nest area.

5. The transmission system of claim 3 and additionally including:
(a) amplifier means for amplifying said electrical signal before it is received by said coupler means; and,
(b) attenuator means for attenuating the signal output by said microphone portion to said microphone/transmitter whereby the signal-to-noise ratio is improved and saturation of the microphone/transmitter is prevented.

6. The transmission system of claim 5 and additionally including:
switch means for contacting a wall area defining said nest area and automatically activating said attenuator means when said microphone/transmitter is inserted into said nest area and deactivating said attenuator means when said microphone/transmitter is removed from said nest area whereby normal handheld operation of said microphone/transmitter is unaffected.

7. In a wireless audio transmission system comprising a portable, hand-held microphone/transmitter for transmitting audio received by a microphone portion thereof as broadcast electrical signals, said microphone/transmitter having a case with at least one microphone inside connected to said microphone portion and disposed adjacent a sidewall thereof, the improvement to allow use of the microphone/transmitter for transmitting prerecorded audio, and the like, comprising:
(a) nesting means having a nest area therein for receiving and substantially surrounding a majority of the surface area of the microphone/transmitter in its case;
(b) input means disposed within said nesting means for receiving an electrical signal containing audio information at an input thereof; and,
(c) coupler means disposed in said nest and connected to said input means for receiving and coupling audio information from said electrical signal to the microphone of the microphone/transmitter at said sidewall whereby said audio can be transmitted wirelessly to a receiver which is tuned to receive the broadcast electrical signals.

8. The improvement to a wireless transmission system of claim 7 wherein:
(a) the microphone/transmitter contains rechargable batteries; and,
(b) said nesting means includes charging means for charging said batteries when the microphone/transmitter is being held in said nest area.

9. The improvement to a wireless transmission system of claim 7 wherein:
said coupler means includes speaker means for creating an audio signal which is acoustically coupled to the microphone portion.

10. The improvement to a wireless transmission system of claim 7 wherein:
said coupler means includes coil means for creating a magnetic field signal which is inductively coupled into a coil in said microphone portion.

11. The transmission system of claim 10 and additionally including:
(a) amplifier means for amplifying the electrical signals before they are received by said coupler means; and,
(b) attenuator means for attenuating the signal output by the microphone portion to the microphone/transmitter whereby the signal-to-noise ratio is improved and saturation of the microphone/transmitter is prevented.

12. The transmission system of claim 11 and additionally including:
switch means for contacting a wall area defining said nest area and automatically activating said attenuator means when said microphone/transmitter is inserted into said nest area and deactivating said attenuator means when said microphone/transmitter is removed from said nest area whereby normal handheld operation of said microphone/transmitter is unaffected.

13. In a wireless transmission system comprising a stereo microphone/transmitter for transmitting information received by a pair of dynamic microphones in a microphone portion of said microphone transmitter as FM band electrical signals to an FM band stereo receiver to be received and used by said receiver, the improvement for using said system with the microphones in an open state for the wireless transmission of electrical signals containing information from a source to a removed location with suppressed background noise comprising:
(a) input means for receiving the electrical signals containing the information at an input thereof; and,
(b) coupler means connected to said input means for removably holding the microphone/transmitter and for receiving, amplifying, and inductively coupling the information from the electrical signal to the dynamic microphones in the microphone portion of the microphone/transmitter, said coupler means including means for attenuating the signals out of the dynamic microphones prior to their being used by the transmitter portion whereby the information is transmitted wirelessly to the FM band stereo receiver for use while the background noise is suppressed.

14. The method of transmitting an information signal wirelessly between a source and a user at a removed location comprising the steps of:
(a) converting the information signal to an amplified first electrical signal carrying the information;
(b) using the amplified first electrical signal to create a magnetic coupling signal carrying the information;
(c) using the magnetic coupling signal to inductively drive a dynamic microphone in the microphone portion of an FM microphone/transmitter and attenuating the signal out of the dynamic microphone prior to using it in the transmitter portion of the microphone/transmitter whereby the microphone/transmitter broadcasts an FM band signal carrying the information with background noise picked up by the dynamic microphone suppressed;
(d) receiving the FM band signal at the removed location;
(e) converting the FM band signal to a second electrical signal carrying the information; and,
(f) using the second electrical signal as the source of the information.

15. The method of transmitting an audio signal wirelessly between a source and broadcast speakers at a removed location comprising the steps of:
(a) converting the audio signal to a first electrical signal carrying the audio information;

(b) using the first electrical signal to create an amplified, non-acoustic coupling signal carrying the audio information;

(c) using the coupling signal to drive the microphone of a microphone/transmitter while attenuating the signal out of the microphone before it is input to the transmitter portion of the microphone/transmitter so that the microphone/transmitter broadcasts a broadcast band signal carrying the audio information while rejecting background noise picked up by the microphone;

(d) receiving the broadcast band signal at the removed location;

(e) converting the broadcast band signal to a second electrical signal carrying the audio information; and, (f) using the second electrical signal to drive the broadcast speakers.

16. The method of transmitting an audio signal wirelessly between a source and broadcast speakers at a removed location comprising the steps of:

(a) converting the audio signal to a first electrical signal carrying the audio information;

(b) amplifying said first electrical signal;

(c) disposing an induction coil adjacent the coil of a dynamic microphone of a microphone/transmitter;

(d) attenuating the signal out of the dynamic microphone before it is input to the transmitter portion of the microphone/transmitter;

(e) inducing the amplified first electrical signal carrying the audio information into the coil of the dynamic microphone so that the microphone/transmitter broadcasts a broadcast band signal carrying the audio information;

(f) receiving the broadcast band signal at the removed location;

(g) converting the broadcast band signal to a third electrical signal carrying the audio information; and, (h) using the third electrical signal to drive the broadcast speakers.

17. A wireless information transmission system comprising:

(a) input means for receiving an electrical signal containing the information at an input thereof;

(b) a microphone/transmitter for transmitting information received by a microphone portion containing a dynamic microphone of said microphone/transmitter as broadcast band electrical signals; and, (c) coupler means connected to said input means for removably holding said microphone/transmitter and for receiving and coupling said information from said electrical signal to said microphone portion of said microphone/transmitter, said coupler means including means for inductively coupling said electrical signal to said dynamic microphone and means for attenuating the signal out of said dynamic microphone whereby said information can be transmitted wirelessly to a broadcast band receiver and be derived for use by said receiver while background noise picked up by said dynamic microphone is suppressed.

* * * * *